(12) United States Patent
Van Amerongen

(10) Patent No.: US 6,658,102 B1
(45) Date of Patent: Dec. 2, 2003

(54) ELECTRONIC CALL ASSISTANT

(75) Inventor: Vincent Reinier Van Amerongen, Leiden (NL)

(73) Assignee: Koninklijke KPN N.V., Groningen (NL)

(*) Notice: Subject to any disclaimer, the term of this patent is extended or adjusted under 35 U.S.C. 154(b) by 0 days.

(21) Appl. No.: 09/601,950

(22) PCT Filed: Feb. 18, 1999

(86) PCT No.: PCT/EP99/01012

§ 371 (c)(1), (2), (4) Date: Aug. 9, 2000

(87) PCT Pub. No.: WO99/46918

PCT Pub. Date: Sep. 16, 1999

(30) Foreign Application Priority Data

Mar. 9, 1998 (EP) .............................................. 98200742

(51) Int. Cl.[7] ............................................... H04M 3/42
(52) U.S. Cl. .............................. 379/201.02; 379/201.03
(58) Field of Search ....................... 379/201.02, 201.03, 379/201.07, 207.08

(56) References Cited

U.S. PATENT DOCUMENTS 5,652,789 A * 7/1997 Miner et al. ........... 379/201.01

* cited by examiner

Primary Examiner—Ahmad F. Matar
Assistant Examiner—Quynh H. Nguyen
(74) Attorney, Agent, or Firm—Michaelson & Wallace; Peter L. Michaelson; Janet M. Skafar

(57) ABSTRACT

A method and apparatus for communication by means of an electronic call assistant which is able to operate in at least either a background mode or in a foreground mode wherein: the electronic call assistant is arranged to arrange waiting tasks in a priority list in accordance with a priority sequence; and the foreground mode comprises at least a guiding mode which is entered by the electronic call assistant as soon as a user has switched the electronic call assistant from its background to its foreground mode and in which the electronic call assistant controls carrying out the waiting tasks in accordance with the priority sequence of the waiting tasks in the priority list.

20 Claims, 4 Drawing Sheets

ELECTRONIC CALL ASSISTANT

The present invention relates to a method of communication between a first communication apparatus and at least one second communication apparatus, implemented by an electronic call assistant which is able to operate in at least either a background mode in which the electronic call assistant is able to monitor a first number of tasks or in a foreground mode in which the electronic call assistant is able to control carrying out a second number of tasks.

Such a method is known from U.S. Pat. No. 5,652,789.

U.S. Pat. No. 5,652,789 describes a computer-based electronic assistant which is arranged among others to receive and manage incoming calls to a subscriber. The electronic assistant, after having received the incoming call, establishes a first communication link with the caller and a second communication link between the caller and the subscriber. It then operates in a foreground mode. After having established the communication links it shifts to a back-ground mode in which it monitors the communication between the caller and the subscriber. By means of a summoning command (i.e., the spoken command "Wildfire") the electronic assistant can be switched back to the foreground mode in which it is able to carry out several commands given by the subscriber.

After having established the first communication link, the electronic assistant assists the caller to trace the subscriber to whom the caller wants to be connected. The electronic assistant, e.g., checks whether the subscriber is already calling, whether the subscriber is away, or does not want to accept any telephone calls. The electronic assistant may even try to locate the subscriber in an other place where he is supposed to be at the moment of calling according to a schedule made up by the subscriber. If any of the attempts of the electronic assistant to locate the subscriber, and thus to establish the second communication link, fails it may request the caller to leave a message and send an e-mail message to the subscriber's workstation.

When the subscriber is present but busy with another telephone call, the electronic assistant may briefly interrupt the actual call to notify the subscriber of the waiting call and request him whether he wishes to be interrupted by the waiting caller. Additionally, visual messages may be sent to a workstation of the subscriber. If the subscriber does not want to be interrupted the electronic assistant will automatically provide the second communication link as soon as the actual call has finished. However, if the subscriber agrees to be interrupted by the second caller, the electronic assistant places the first caller on hold and establishes a communication link between the second caller and the subscriber. When during this latter telephone call a third caller calls the same procedure is repeated, and thus a queue of waiting callers on hold may be formed. To switch to one of the waiting callers the subscriber first generates the summoning command ("Wildfire") to the electronic assistant in order to put it to the foreground mode. Then, the subscriber gives a predetermined command (the "press-the-hold-button" command) as many times as is needed to reach the waiting caller concerned.

Other options of the electronic assistant disclosed by U.S. Pat. No. 5,652,769 are managing a schedule of the subscriber, sending messages, sending reminders to the subscriber, and keeping records as to persons, groups of persons and places, as well as telephone records.

The known system is able to accept both spoken commands and electronic commands, e.g., generated by the keys of a telephone apparatus. The electronic assistant sends its messages to the subscriber either by artificial, spoken language or by messages shown on a monitor or the like.

In general, in U.S. Pat. No. 5,652,789 switching between the back-ground and foreground modes happens in the following way. When the electronic assistant is in its foreground mode and the subscriber says "That will be all for now", the electronic assistant jumps to the back-ground mode. When the electronic assistant is in its back-ground mode the subscriber has to generate the summoning command ("Wildfire"). Then, the electronic assistant enters a kind of main menu and replies "Here I am" to confirm its active status. The subscriber is then allowed to choose any command of a predetermined set of commands that are supported by the electronic assistant. For instance, to deal with a queue of callers on hold, the subscriber uses the command "Who's on hold".

There is no priority schedule for the tasks that may be carried out by the electronic assistant, and the subscriber has to know the full set of possible commands to work on the level of the main menu. For some subscribers this may be a burden to use the electronic assistant since it lays too much emphasis on the knowledge of the subscriber.

The object of the present invention is to improve the user-friendliness of electronic call assistants.

Therefore, the present invention provides a method as defined at the outset which is characterized in that the electronic call assistant is arranged to arrange waiting tasks in a priority list in accordance with a priority sequence, and that the foreground mode comprises at least a guiding mode which is entered by the electronic call assistant as soon as a user of the electronic call assistant has switched the electronic call assistant from its background to its foreground mode and in which the electronic call assistant controls carrying out the waiting tasks in accordance with the priority sequence of the waiting tasks in the priority list.

Such an electronic call assistant greatly helps users of a communication apparatus which is provided with the electronic call assistant, when the users are not very familiar with all of its features. When the user instructs the electronic call assistant to enter its foreground mode the electronic call assistant takes over full control of the communications and assists the user step-by-step through the tasks waiting in the priority list in accordance with the priority sequence of the waiting asks.

However, the provision of such a guiding mode within the foreground mode may be extended by the provision of a main menu mode known from the prior art. In such an embodiment the electronic call assistant is also able to enter a main menu mode in its fore. ground mode, in which the electronic call assistant is able to receive commands of the user, the commands being related to tasks of equal priority.

Preferably, the electronic call assistant is arranged for automatically entering the main menu mode from the guiding mode after it has established that there are no waiting tasks in the priority list. Thus, the electronic call assistant always gives priority to dealing with waiting tasks in the priority list, as soon as it enters the foreground mode.

However, it is also possible to give the user the possibility to leave the guiding mode and to jump to the main menu mode in which the user has more control. In such an embodiment the electronic call assistant is arranged to request the user in the guiding mode whether he wishes to deal with any waiting task at any time the electronic call assistant is starting to deal with a next waiting task, and to jump to the main menu mode when the user informs the electronic call assistant not to do so.

Sometimes, the user is calling with a caller at the time the user switches the electronic call assistant from its background to its foreground mode. This may be the case when the user is calling with the caller and the electronic call assistant informs the user, e.g. by a beep, that there is an urgent waiting task. Then, the electronic call assistant may be arranged to put the caller on hold.

Examples of tasks which may be carried out by the electronic call assistant in its main menu are:
- returning to a caller on hold;
- automatic dialling either by voice or digit dialling;
- reading either an e-mail or a voice mail box;
- transmitting a message to either an e-mail, a voice mail box or a facsimile apparatus;
- reading a facsimile by means of optical character recognition (o.c.r.)
- completing a call;
- screening a call;
- monitoring reminders.

The method of the present invention may include that the electronic call assistant is arranged to switch from its background mode to its guiding mode after the user has operated a *-key of his communication apparatus. The communication apparatus may be a common telephone apparatus. When the electronic call assistant is implemented by means of software in a telephone exchange, this means that no new telephone apparatuses need to be installed to carry out the method according to the invention. Any user can simply activate his electronic call assistant by operation of the *-key of his telephone apparatus. The electronic call assistant will then communicate with the user by means of artificial, spoken language, whereas the user can communicate with the electronic call assistant by means of spoken language or by operating keys of his telephone apparatus (DTMF—Dual Tone Multi Frequency).

For carrying out the method according to the invention, the present invention also relates to a communication apparatus for communication with at least one other communication apparatus comprising electronic call assistant means able to operate in at least either a background mode in which the electronic call assistant means is able to monitor a first number of tasks or in a foreground mode in which the electronic call assistant means is able to control carrying out a second number of tasks characterized in
- that the electronic call assistant means is arranged to arrange waiting tasks in a priority list in accordance with a priority sequence, and
- that the foreground mode comprises at least a guiding mode which is entered by the electronic call assistant means as soon as a user of the electronic call assistant means has switched the electronic call assistant means from its background to its foreground mode and in which the electronic call assistant means controls carrying out the waiting tasks in accordance with the priority sequence of the waiting tasks in the priority list.

In one embodiment the electronic call assistant means is also able to enter a main menu mode in its foreground mode, in which the electronic call assistant means is able to receive commands of the user, the commands being related to tasks of equal priority.

The communication apparatus might be a telephone apparatus comprising a *-key, wherein the electronic call assistant means is arranged to switch from its background mode to its guiding mode after the user has operated the *-key.

The present invention also relates to a computer readable medium provided with software which, after being read by and installed on a communication apparatus as defined above, provides the communication apparatus with an electronic call assistant means able to operate in at least either a background mode in which the electronic call assistant means is able to monitor a first number of tasks or in a foreground mode in which the electronic call assistant means is able to control carrying out a second number of tasks wherein
- the electronic call assistant means is arranged to arrange waiting tasks in a priority list in accordance with a priority sequence, and
- the foreground mode comprises at least a guiding mode which is entered by the electronic call assistant means as soon as a user of the electronic call assistant means has switched the electronic call assistant means from its background to its foreground mode and in which the electronic call assistant means controls carrying out the waiting tasks in accordance with the priority sequence of the waiting tasks in the priority list.

In one embodiment, such a computer readable medium provides the communication apparatus with the electronic call assistant means which is also able to enter a main menu mode in its foreground mode, in which the electronic call assistant means is able to receive commands of the user, the commands being related to tasks of equal priority.

The software related to the electronic call assistant means need not be implemented on a communication apparatus like a telephone apparatus. The software related to the electronic call assistant means for any user may be located centrally in a telephone exchange which is communicating with any of the communication apparatuses. Therefore, the invention also relates to a communication system comprising at least a first communication apparatus and a second communication apparatus, and comprising electronic call assistant means able to operate in at least either a background mode in which the electronic call assistant means is able to monitor a first number of tasks or in a foreground mode in which the electronic call assistant means is able to control carrying out a second number of tasks characterized in
- that the electronic call assistant means is arranged to arrange waiting tasks in a priority list in accordance with a priority sequence, and
- that the foreground mode comprises at least a guiding mode which is entered by the electronic call assistant means as soon as a user the electronic call assistant means has switched the electronic call assistant means from its background to its foreground mode and in which the electronic call assistant means controls carrying out the waiting tasks in accordance with the priority sequence of the waiting tasks in the priority list.

In one embodiment of such a communication system, the electronic call assistant means may also be able to enter a main menu mode in its foreground mode, in which the electronic call assistant means is able to receive commands of the user, the commands being related to tasks of equal priority.

The software related to the electronic call assistant means may be distributed by a computer readable medium as defined above. However, alternatively, the software may also be downloaded to end-users from a central location. Therefore, the present invention also relates to a method of transmission of software which, after being read by and installed on a communication apparatus as defined above, provides the communication apparatus with an electronic call assistant means able to operate in at least either a background mode in which the electronic call assistant means is able to monitor a first number of tasks or in a foreground mode in which the electronic call assistant means is able to control carrying out a second number of tasks, wherein the electronic call assistant means is arranged to arrange waiting tasks in a priority list in accordance with a priority sequence, and the foreground mode comprises at least a guiding mode which is entered by the electronic call assistant means as soon as a user of the electronic call assistant means has switched the electronic call assistant means from its background to its foreground mode and in which the electronic call assistant means controls carrying out the waiting tasks in accordance with the priority sequence of the waiting tasks in the priority list.

In such a method of transmission, the software may provide the communication apparatus with the electronic call assistant means which is also able to enter a main menu mode in its foreground mode, in which the electronic call assistant means is able to receive commands of the user, the commands being related to tasks of equal priority.

The present invention will be explained with reference to some drawings which are explained below. The drawings are intended to illustrate the present invention and not to limit the scope of the present invention.

Below, the present invention will be further explained with reference to the drawings. Hereinafter, reference will be made to a PCA, a personal call assistant, as being equivalent to an electronic call assistant defined above.

Figure 1:
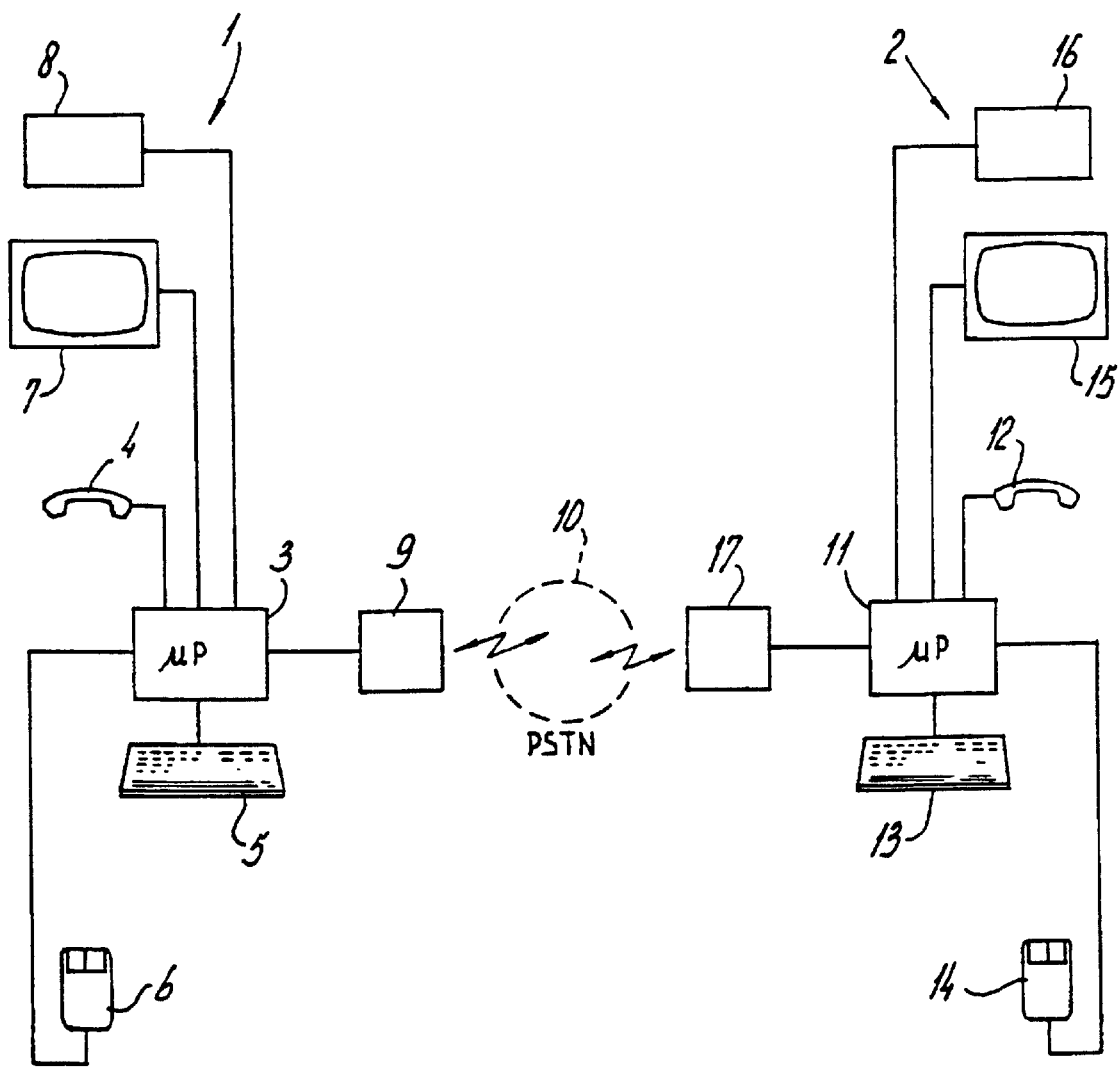
FIG. 1 shows a telecommunication system with two telecommunication apparatuses communicating with each other through the public switched telephone network (PSTN).

A system which is able to deal with a PCA in accordance with the present invention is shown in FIG. 1. The system comprises several communication apparatuses 1, 2. The communication apparatuses 1, 2 each comprise, in a sophisticated embodiment, a microprocessor 3, 11. The microprocessor 3, 11 is connected to a memory 8, 16, display means 7, 15, means for inputting spoken language from a user and sending (artificial) spoken language to a user like a telephone receiver 4, 12, and input means for manually inputting commands and data to the microprocessor 3, 11 like a keyboard 5, 13 and a mouse 6, 14. The microprocessor 3, 11 may be provided with other means for inputting data and commands, like a CD-ROM unit and a floppy disk unit (not shown).

In the embodiment shown in FIG. 1, the communication apparatuses 1, 2 may be perceived as a personal computer provided with a telephone receiver 4, 12 connected to the microprocessor 3, 11. However, in its most simple form, the telecommunication apparatuses 1, 2 are embodied as a telephone apparatus. Such a telephone apparatus may be provided with a simple or complex display 7, 15, a simple or a complex microprocessor and a conventional keyboard. Actually, in order to be able to implement the present invention a telephone apparatus need only comprise one additional key apart from the number keys, for instance a *-key, as will be explained hereinafter.

The microprocessor 3, 11 is connected to a telephone exchange 9, 17. The connection between the microprocessor 3, 11 and the telephone exchange 9, 17 may be a physical one, however, it may also be a wireless connection.

The telephone exchanges 9, 17 are arranged for communicating with one another, e.g., through a public switched telephone network (PSTN) 10. Of course, any other type of communication between the telephone exchanges 9, 17 may be used. Moreover, it is noted that it is not strictly necessary to have two telephone exchanges 9, 17 between two communicating communication apparatuses 1, 2. They may communicate with one another through one or more telephone exchanges.

Figure 2:
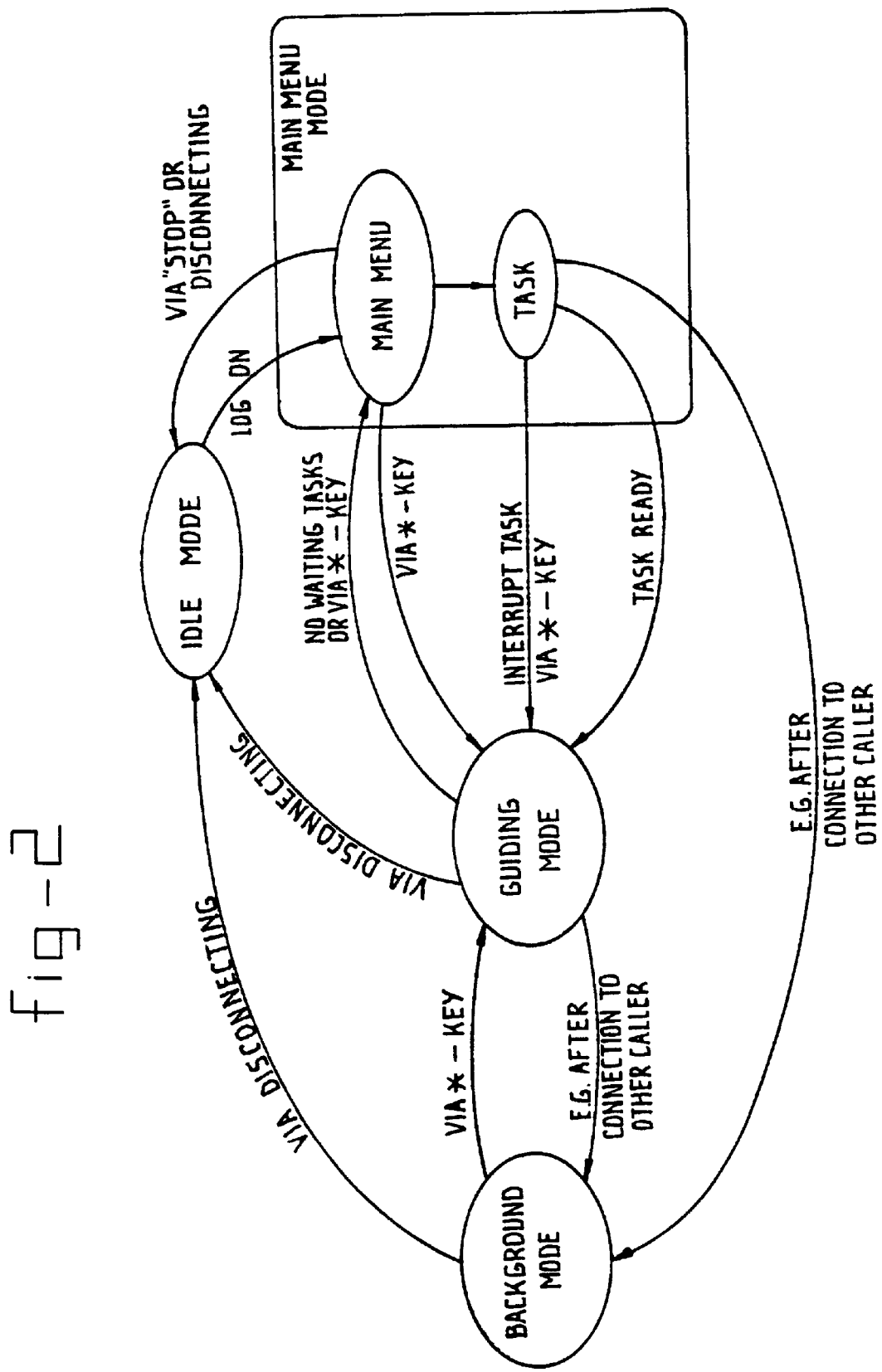
FIG. 2 shows an architecture of the electronic call assistant in accordance with the present invention.

FIG. 2 shows, in a schematical way, the architecture of the PCA in accordance with the present invention. The architecture comprises four different modi: a background mode, an idle mode, a main menu mode and a guiding mode. Using a background, idle and main menu mode can be conceived to be known from the prior art, whereas the guiding mode and its relations with the other modi form the hart of the invention.

The idle mode is the mode in which neither the user has logged on to his/her PCA nor a third party tries to establish a call with the user. In the idle mode, the PCA is able to carry out of-line tasks, like monitoring the time and carrying out a predetermined task as soon as a predetermined moment has been reached. Such a task may be calling the user and informing him of a predetermined warning (like "do not forget your appointment at 12.00 o'clock"), or sending a facsimile message or voice mail, etc.

In the main menu mode, the PCA is able to communicate with either the user or a third party trying to call the user, and to carry out predetermined tasks on behalf of the user or the third party. To enter the main menu mode from the idle mode, the user has to log on through a predetermined method, like calling a specific telephone number and identifying himself/herself via an identification number. The main menu mode is the only available mode within the foreground mode of the prior art. In the main menu mode, a main menu is entered in which the PCA waits for commands of the user or third party and than carries out tasks as specified by the commands. When the task is ready the guiding mode is entered.

Preferably, the user can always leave the main menu mode and jump to the guiding mode by a predetermined command, e.g., a signal generated by pressing the *-key of his telephone apparatus. This can be done either when the PCA is in the main menu or when the PCA is busy carrying out a task. In the latter case, the system works on an interrupt basis.

The main menu mode will be left for a jump to the idle mode when the user disconnects or when the user gives a predetermined command to the PCA, like "stop", when the PCA is in the main menu.

The background mode is the mode in which the PCA is on-line for the user but in which the user is e.g. calling to another person and the PCA is not allowed to be triggered to carry out a task by accident when the user says a word which would mean a commands for the PCA. In the background mode, the PCA can only be activated by a predetermined command, preferably a signal generated by the user by pressing the *-key. If the user does so, the PCA jumps to the guiding mode.

When the user disconnects in the background mode, the PCA jumps to the idle mode.

The guiding mode is the mode in which the PCA guides the user through a list of waiting tasks which are stored in a sequence determined by a predetermined priority. In this mode, the PCA has full control over the order in which the waiting tasks are carried out. If the list does not comprise any waiting task or any waiting task has been carried out the PCA jumps to the main menu mode. Preferably, the user can also always leave the guiding mode to jump to the main menu mode by pressing the *-key.

When the user disconnects in the guiding mode, the PCA jumps to the idle mode.

Although FIG. 2 shows that the PCA jumps from the idle mode to the main menu mode upon the user logging on, alternatively, the PCA can be implemented such that upon logging on the PCA jumps to the guiding mode. Logging on could be implemented by pressing the *-key. Then, an arrangement could be provided in which the PCA always jumps to the guiding mode when the PCA is in any of the three other modes and the user presses the *-key. This would greatly facilitate user-friendliness.

Now, the background mode and the guiding mode will be explained in detail with reference to FIG. 3, which shows an example of a flow diagram of the operation of these modes. Assume that the user has activated his PCA and is now calling with a third party. Then, the PCA is in its background mode. The PCA checks whether the user has disconnected. If so, the PCA returns to the idle mode (step 21). If not, the PCA checks whether the user of a communication apparatus, e.g. the one designated with reference number 1, instructs the PCA to switch from its background mode to its foreground mode. Preferably, the user does so by pressing the *-key of his communication apparatus 1, step 22.

The PCA checks whether the user is still busy with his telephone call. If so, the PCA puts the first caller on-hold, step 24. The PCA does so by putting the call with the first caller as a waiting task in his priority list, e.g., on a position with lowest priority.

Then, the PCA enters the guiding mode which will be illustrated by means of steps 26–34. In case the PCA would have been an electronic call assistant in accordance with the prior art, then, after step 24, the PCA would directly enter the main menu mode which will be illustrated hereinafter with reference to FIG. 4.

In accordance with the present invention, the PCA has made up a priority list in which waiting tasks are stored in accordance with a priority sequence. The task with the highest priority will be dealt with by the PCA first, etc. An example of a priority sequence for ordering waiting tasks in the priority list is:

1. urgent reminder messages monitored by the PCA and to be notified to a predefined user as soon as a predetermined time limit expires;.
2. monitoring calls on hold;
3. informing the user of messages received by, voice mail or e-mail;
4. monitoring non-urgent reminder messages.

If required, the PCA can be arranged to order calls on hold in accordance with a further priority sequence determined by the user. The same may apply for messages in the voice mail box.

The PCA is arranged to make up and update the content of the) priority list in any of its modes.

In step 26, the PCA checks whether the priority list comprises any waiting task.

If so, the PCA, preferably, requests the user if he wishes to deal with any of the waiting tasks stored in the priority list, step 28. Step 28 may be omitted, however, the provision of step 28 improves the user-friendliness of the PCA.

If the user has informed the PCA that the PCA may deal with the waiting tasks, the PCA checks whether the waiting task is a call on hold. If not (step 29), the PCA deals with the waiting task having the highest priority, step 30. The task is dealt with by the PCA, preferably uninterrupted. However, at any time the user may press the *-key in order to let the PCA jump to the main menu in the main menu mode.

After the PCA has completed the task with highest priority, step 32, the PCA enters step 34 in which it checks whether there is any further waiting task in the priority list with a lower priority. If so, the PCA returns to step 28, in which the user again has the possibility to interrupt the dealing with waiting tasks in the priority list. If not, the PCA jumps to the main menu mode through line 56.

When, in step 29, the PCA establishes that the waiting task to be dealt with is a waiting call, the PCA requests the user whether he wishes to be connected to the caller on hold, step 31. If not, the PCA may, e.g., jump to the following waiting task through step 34. If so, the PCA connects the user to the caller on hold, step 33, and jumps to the background mode, indicated with point A.

By repeating steps 28 through 34, the PCA guides the user automatically through any of the waiting tasks in the priority list, while step 28 provides the user of the possibility to interrupt this sequence after the completion of any of the waiting tasks.

Note that the user can be reconnected to the first caller on hold, since his interrupted call with the first caller has been put as a waiting task in the priority list which is sequentially dealt with by the PCA. Further note that the priority list may be updated while waiting tasks are dealt with in the guiding mode. E.g., reporting a voice mail receipt might be inserted in the priority list while another task is dealt with.

In one embodiment of the invention, the PCA is only provided with the guiding mode in its foreground mode. In this embodiment, after the PCA has established, in step 26, that no tasks are waiting in the priority list, the PCA jumps back to point A in its background mode. This has been indicated by a dashed line 54 in FIG. 3.

Preferably, the foreground mode not only comprises a guiding mode but also a main menu mode. The main menu mode gives the user more control over the tasks to be carried out. Whereas in the guiding mode the PCA is the primary controller of the tasks being carried out, in the main menu mode the PCA only carries out tasks if explicitly instructed by the user to do so.

Figure 4:
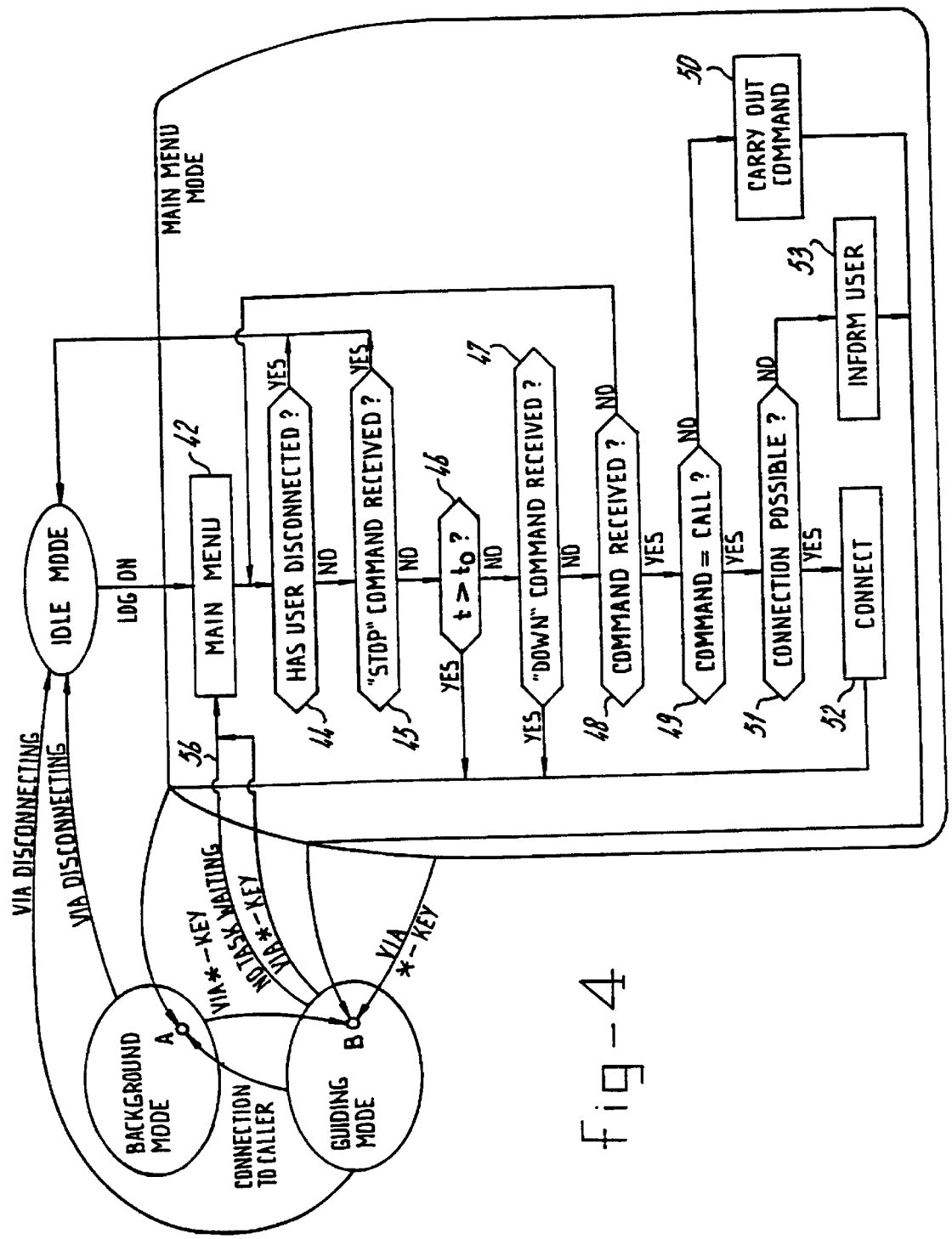
FIG. 4 shows a flow diagram of the main menu mode.

In step 26 within the guiding mode, the PCA has checked whether there are any tasks waiting in the priority list. If so, the PCA deals with them as explained above, starting with step 28. Note that the user can be reconnected to the first caller on hold, since his interrupted call with the first caller has been put as a waiting task in the priority list which is sequentially dealt with by the PCA. Further note that the priority list may be updated while waiting tasks are dealt with in the guiding mode. E.g., reporting a voice mail receipt might be inserted in the priority list while another task is dealt with. However, if the PCA establishes that there are no tasks waiting in the priority list, the PCA automatically jumps to the main menu, step 42, as shown in FIG. 4.

However, also the user has the possibility of ending the guiding mode at the beginning of each of the waiting tasks within the priority list. The user can do so by informing the PCA that he does not wish to deal with waiting tasks in the priority list, step 28. Then the PCA automatically jumps to the main menu as is indicated by line 56.

Figure 3:
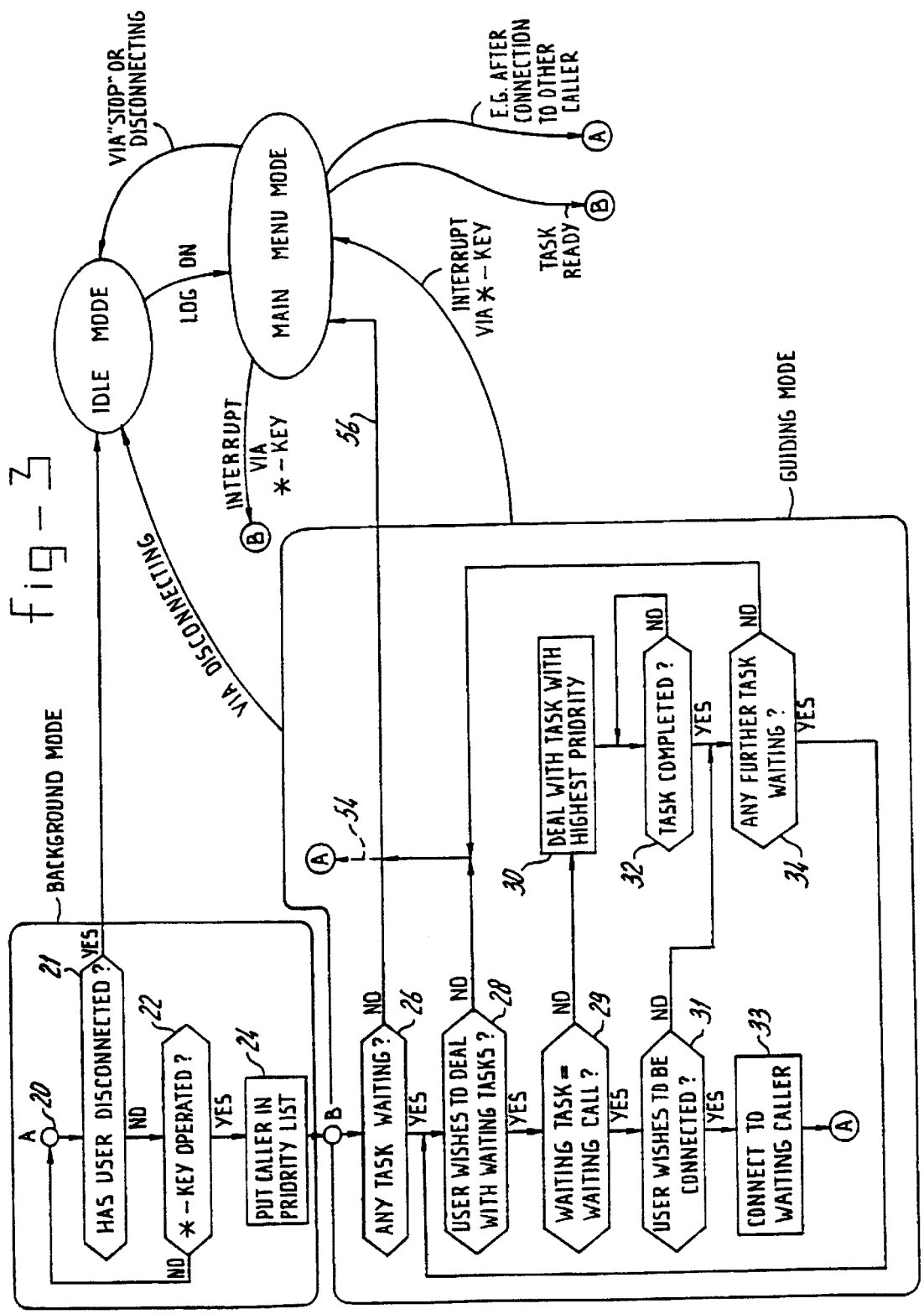
FIG. 3 shows a flow diagram of the background mode and the guiding mode.

Although in FIG. 3 it has been indicated that the PCA first enters the guiding mode after the user has pressed the *-key it is, alternatively, possible that, after the user has pressed the *-key, the PCA presents the user with the option to either enter the guiding mode or the main menu mode. This would need a further decision lock (not shown) between blocks 24 and 26 in which the PCA requests the user to indicate which mode he chooses.

When the PCA enters the main menu, step 42, the user has the possibility of selecting any available task that may be carried out by the PCA. The main menu mode resembles the prior art of electronic call assistant in which there is no priority list with waiting tasks ordered in dependence on a predetermined priority sequence. Examples of selectable PCA tasks within the main menu are:

returning to one or more callers on hold;

voice dialling of persons and/or services;

digit dialling (DTMF) of persons and/or services;

reading out voice mail or e-mail boxes;

transmitting messages to a voice mail or e-mail box of a third party;

completing a call;

screening a call;

monitoring reminders;

reading out reminders;

returning to the background mode after having received an instruction of the user to do so.

It is to be understood, that these options are giving by way of example only. Other options may be introduced without leaving the scope of the present invention.

Moreover, it is to be noted that any of these options, which are available within the main menu mode, may also relate to tasks which are automatically dealt with by the PCA and put into the priority list as waiting tasks with a predetermined priority, to be dealt with in the guiding mode.

After the PCA has entered the main menu, step 42, it jumps to step 44 in which it checks whether the user has disconnected the connection to the PCA, e.g. by hanging up. If so, the PCA jumps to its idle mode.

As long as the user has not disconnected, optionally, the PCA checks in step 45 whether the user has given a "stop" command, i.e., an explicit command for the PCA to go to its idle mode, for instance generated by the user saying "stop". If so, the PCA jumps to its idle mode. If not, the PCA jumps to step 46. In step 46, the PCA, optionally, checks whether a predetermined period of time $t_0$ has expired. If so, the PCA jumps to its background mode. If $t_0$ has not expired, the PCA may check, step 47, whether the user has given an explicit instruction to go to the background mode. This may e.g. be implemented by the user saying "down" to the PCA. It is observed that the steps 46 and 47 may also be implemented in prior art electronic call assistants not having a guiding mode.

When the PCA has not received a "down" command it checks whether another command has been received from the user, step 48.

If no such command has been received the PCA returns to step 44. If a command has been received, the PCA first checks in step 49 whether the command received is a command to call a third party. If not, the PCA jumps to step 50 in which it carries out the set of instructions belonging to the command received. Then, the PCA jumps to the guiding mode, point B.

If, in step 49, the PCA establishes that the command is to call somebody, it checks in step 51 whether a connection to that person can be made. If not (e.g. the person to be called is not at home), the PCA informs the user, step 53, and optionally provides the user with sending a voice mail message or the like. Then, the PCA jumps to point B in the guiding mode. If the connection can be made the PCA does so, step 52, and jumps to point A in the background mode.

Of course, the sequence of steps 44 through 48 can be mutually changed.

Above, it has been indicated that the user is able to switch the PCA from its background mode to its foreground mode by pressing the *-key, step 22. However, such a switch instruction may also be given by a predetermined spoken word. However, using a spoken word has the disadvantage of the PCA needing to continuously check any word spoken by the user. This would need an undue effort of the PCA. Using a predetermined key of e.g. a telephone apparatus is much easier since a signal generated by the operation of such a key can simply operate on an interrupt basis.

Above, it has been indicated that a user is able to switch the PCA from its background mode to its foreground mode and vice versa. However, like in the prior art according to U.S. Pat. No. 5,652,789, the PCA may also be switched from its idle mode to its foreground de by a third party calling the communication apparatus associated with the PCA when there has not been made a connection between the communication apparatus and the PCA. Then, the PCA will communicate with the third party, assisting him/her by tracing the subscriber of the communication apparatus, receiving and storing voice mail or e-mail for the subscriber, etc. As soon as the third party hangs up the PCA will then return to its idle mode.

Preferably, the user has, at any time, the option to switch from the guiding mode to the main menu mode and vice versa. This can, e.g., be implemented by operation of the *-key during either one of these modes. Thus, pressing the *-key in the foreground mode may be interpreted by the PCA to toggle between the guiding mode and the main menu mode. Again, this facilitates the use of the PCA by the user who only has to remember pressing the *-key at any time he is connected to the PCA.

It may be expected that, in the future, a telephone apparatus will resemble more and more a microprocessor, provided with a receiver, as indicated in FIG. 1. In such a case, the PCA has many different options of communicating with the user. For instance, the PCA may communicate with the user with artificial, spoken language which can be heard by the user through receiver 4, 12. However, alternatively, it is possible for the PCA to communicate with the user through the display means 7, e.g. in the form of a Windows® type of user interface on the screen. Then, the user can also use his mouse 6 and his keyboard 5 to select any option of possible tasks presented by the PCA on the screen of the display means 7.

When the communication apparatus 1 is provided with a microprocessor 3 and a memory 8 the PCA may be implemented by software loaded on the microprocessor 3 and the memory 8. This software may either be provided through a computer readable medium, such as a CD-ROM. However, the necessary software may also be downloaded to the communication apparatus 1 through a telephone channel, as is known to persons skilled in the art.

However, alternatively, the software needed for the PCA may also be loaded on the telephone exchange 9 to which a plurality of communication apparatuses (not shown) are connected. Then, the entire portion of the PCA software or a portion thereof can be loaded in the telephone exchange 9. In this case, the maintenance of the PCA software would be greatly simplified. Moreover, adding new features would be easier than when the software is distributed.

In order to further illustrate the present invention, hereinafter two examples of the operation of the PCA in accordance with the present invention are described.

EXAMPLE 1

In this example it is assumed that the subscriber is calling with John Smith, during this call one voice mail is delivered, there are two reminder messages monitored by the PCA; one of this reminder messages is to automatically remind the subscriber at 03.00 o 'clock p.m. of an urgent appointment, whereas the other one is a general reminder which is not urgent. During the telephone call with John Smith, it becomes 03.00 o'clock p.m.

PCA notices that it becomes 03.00 o'clock p.m. and transmits a warning signal, e.g. a beep, to the subscriber; this warning signal may or may not be audible for John Smith;

PCA waits for the subscriber to press the *-key (step 22);

PCA puts John Smith on hold (step 24);

PCA notices that there are tasks waiting (step 26);

PCA requests the subscriber to indicate whether he wishes to deal with waiting tasks (step 28);

assuming the subscriber says "yes", the PCA informs the subscriber of its first reminder message, i.e., the urgent appointment (step 30);

While informing the subscriber of this urgent reminder Pete Clair calls the subscriber. In a time sharing method, the PCA requests Pete Clair to identify himself to the PCA and then puts Pete Clair on hold, i.e., puts him in his task list with the next highest priority.

after having completed the urgent reminder message (step 32), the PCA notices that there are tasks waiting in the priority list, a.o., Pete Clair is on hold (step 34);

PCA requests the subscriber to indicate whether he wishes to deal with waiting tasks (step 28);

assuming the subscriber says "yes" and the subscriber indicates to wish to be connected (steps 29 and 31), the PCA connects the subscriber to Pete Clair (step 33) and jumps to the background mode; after having completed the call with Pete Clair the subscriber, knowing that John Smith is still on hold, presses the *-key (step 22) and the PCA enters the guiding mode; the PCA notices that there are still tasks waiting (step 26) and repeats steps 28 through 34 for the voice mail message and the non-urgent reminder message; then, the PCA notes that John Smith is still on hold, the PCA requests the subscriber to indicate whether he wishes to continue his call with John Smith (step 31); if so, the PCA connects him to John Smith (step 33) and jumps to the background mode;

then, the subscriber will disconnect after his call with John Smith and the PCA returns to its idle mode through step 21.

EXAMPLE 2

In this second example it is assumed that the subscriber is not calling but that he takes up the phone to make use of the PCA service to dial an external service; one voice mail has been delivered and there are two non-urgent reminder messages monitored by the PCA PCA is logged on and jumps to the main menu and then to the guiding mode upon the subscriber pressing the *-key;

PCA notices that there are tasks waiting (step 26);

PCA requests the subscriber to indicate whether he wishes to deal with waiting tasks (step 28);

assuming the subscriber says "yes", the PCA informs the subscriber of its first reminder message (step 30);

after having completed the first reminder message (step 32), the PCA notices that there are still tasks waiting (step 34);

PCA requests the subscriber again to indicate whether he wishes to deal with waiting tasks (step 28);

assuming the subscriber says "no", the PCA jumps to the main menu;

assuming the subscribers says "yes", the PCA repeats steps 28 through 34 for the voice mail message and the second reminder message; then, the PCA notices that there are no further tasks (step 34) and jumps to the main menu;

within the time period determined by $t_0$, the subscriber has the possibility to instruct the PCA to dial the external service concerned, e.g., traffic information. The instructions may be given by voice, by DTMF or by operating any of the input means 5, 6.

What is claimed is:

1. A method of communication between a first communication apparatus (1) and at least one second communication apparatus (2) implemented by an electronic call assistant which is able to operate in at least either a background mode in which the electronic call assistant is able to monitor a first number of tasks or in a foreground mode in which the electronic call assistant is able to control carrying out a second number of tasks, the foreground mode comprising a main menu mode in which the electronic call assistant is able to receive commands of said user, the commands being related to tasks of equal priority, characterised in that the electronic call assistant is arranged to arrange waiting tasks, comprising different types of tasks, in a priority list in accordance with the priority sequence based on the type of task, the different types of tasks comprising reminder messages, calls on hold, and voicemail or email messages, and that the foreground mode comprises at least a guiding mode which is entered by the electronic call assistant as soon as a user of the electronic call assistant has switched the electronic call assistant from its background to its foreground mode and in which the electronic call assistant controls carrying out the waiting tasks in accordance with the priority sequence of the waiting tasks in the priority list.

2. A method of communication according to claim 1 wherein the electronic call assistant is arranged for automatically entering the main menu mode from the guiding mode after it has established that there are no waiting tasks in the priority list (step 26).

3. A method of communication according to claim 1 wherein the electronic call assistant is arranged to request said user in the guiding mode whether he wishes to deal with any waiting task any time the electronic call assistant is starting to deal with a next waiting task, and to jump to the main menu mode when said user informs the electronic call assistant not to do so (step 28).

4. A method of communication according to claim 1 wherein the electronic call assistant is arranged to put a caller on hold when said user is calling with said caller at the time the user switches the electronic call assistant from its background to its foreground mode (step 24).

5. A method of communication according to claim 4 wherein the electronic call assistant is arranged to reconnect said user to said caller after having carried out any waiting task desired by said user (step 31) if said caller is then still on hold (step 33).

6. A method of communication according to claim 1 wherein the electronic call assistant is arranged for carrying out at least one of the following tasks in its main menu:

returning to a caller on hold;

automatic dialling either by voice or digit dialling;

reading either an e-mail or a voice mail box;

transmitting a message to either an e-mail or a voice mail box;

completing a call;

screening a call;

monitoring reminders.

7. A method of communication according to claim 1 wherein the electronic call assistant is arranged to switch from its background mode to its guiding mode after said user has operated a *-key of his communication apparatus.

8. A method according to claim 1 wherein the electronic call assistant is arranged to toggle between the guiding mode and the main menu mode after a user has instructed it to do so by generating a predetermined toggle signal.

9. A method according to claim 8 wherein the toggle signal is generated upon the user pressing a *-key of his communication apparatus.

10. A communication apparatus (1) for communication with at least one other communication apparatus (2) comprising electronic call assistant means (3, 8) able to operate in at least either a background mode in which the electronic call assistant means (3, 8) is able to monitor a first number of tasks or in a foreground mode in which the electronic call assistant means (3, 8) is able to control carrying out a second number of tasks, the foreground mode comprising a main menu mode in which the electronic call assistant means (3, 8) is able to receive commands of said user, the commands being related to tasks of equal priority, characterised in that the electronic call assistant means (3, 8) is arranged to arrange waiting tasks comprising different types of tasks, in a priority list in accordance with a priority sequence based on the type of task, the different types of tasks comprising reminder messages, calls on hold, and voicemail or email messages, and in that the foreground mode comprises at least a guiding mode which is entered by the electronic call assistant means (3, 8) as soon as a user of the electronic call assistant means has switched the electronic call assistant means (3, 8) from its background to its foreground mode and in which the electronic call assistant means (3, 8) is arranged to control carrying out the waiting tasks in accordance with the priority sequence of the waiting tasks in the priority list.

11. A communication apparatus according to claim 10 wherein the electronic call assistant means (3, 8) is arranged for automatically entering the main menu mode from the guiding mode after it has established that there are no waiting tasks in the priority list (step 26).

12. A communication apparatus according to claim 10 wherein the electronic call assistant means (3, 8) is arranged to request said user in the guiding mode whether he wishes to deal with any waiting task any time the electronic call assistant means (3, 8) is starting to deal with a next waiting task, and to jump to the main menu when said user informs the electronic call assistant means (3, 8) not to do so (step 28).

13. A communication apparatus according to claim 10 wherein the electronic call assistant means (3, 8) is arranged to put a caller on hold when said user is calling with said caller at the time the user switches the electronic call assistant means (3, 8) from its background to its foreground mode (step 24).

14. A communication apparatus according to claim 13 wherein the electronic call assistant means (3, 8) is arranged to reconnect said user to said caller after having carried out any waiting task desired by said user (step 31) if said caller is then still on hold (step 33).

15. A communication apparatus according to claim 10, wherein the electronic call assistant means (3, 8) is arranged for carrying out at least one of the following tasks in its main menu:

returning to a caller on hold;

automatic dialling either by voice or digit dialing;

reading either an e-mail or a voice mail box;

transmitting a message to either an e-mail or a voice mail box;

completing a call;

screening a call;

monitoring reminders.

16. A communication apparatus according to claim 10 wherein the communication apparatus is a telephone apparatus comprising a *-key, and the electronic call assistant means (3, 8) is arranged to switch from its background mode to its foreground mode after said user has operated said *-key.

17. A communication apparatus according to claim 10, wherein the electronic call assistant means is arranged to toggle between the guiding mode and the main menu mode after a user has instructed it to do so by generating a predetermined toggle signal, e.g., by operating a *-key.

18. A computer readable medium provided with software which, after being read by and installed on a communication apparatus according to claim 10, provides said communication apparatus with an electronic call assistant means (3, 8) able to operate in at least either a background mode in which the electronic call assistant means (3, 8) is able to monitor a first number of tasks or in a foreground mode in which the electronic call assistant means (3, 8) is able to control carrying out a second number of tasks, the foreground mode comprising a main menu mode in which the electronic call assistant means is able to receive commands of said user, the commands being related to tasks of equal priority, wherein the electronic call assistant means (3, 8) is arranged to arrange waiting tasks in a priority list in accordance with a priority sequence, and the foreground mode comprises at least a guiding mode which is entered by the electronic call assistant means (3, 8) as soon as a user of the electronic call assistant means has switched the electronic call assistant means (3, 8) from its background to its foreground mode and in which the electronic call assistant means (3, 8) controls carrying out the waiting tasks in accordance with the priority sequence of the waiting tasks in the priority list.

19. A communication system comprising at least a first communications apparatus (1) and a second communication apparatus (2), and comprising electronic call assistant means (9) able to operate in at least either background mode in which the electronic call assistant means (9) is able to monitor a first number of tasks or in a foreground mode in which the electronic call assistant means (9) is able to control carrying out a second number of tasks, the foreground mode comprising a main menu mode in which the electronic call assistant means (9) is able to receive commands of said user, the commands being related to tasks of equal priority, characterized in that the electronic call assistant means (9) is arranged to arrange waiting tasks, comprising different types of tasks, in a priority list in accordance with a priority sequence based on the type of task, the different types of tasks comprising reminder messages, calls on hold, and voicemail or email messages, and that the foreground mode comprises at least a guiding mode which is entered by the electronic call assistant means (9) as soon as a user of the electronic call assistant means has switched the electronic call assistant means (9) from its background to its foreground mode and in which the electronic call assistant means (9) controls carrying out the waiting tasks in accordance with the priority sequence of the waiting tasks in the priority list.

20. A method of software which, after being read by and installed on a communication apparatus according to claim 10, provides said communication apparatus with an electronic call assistant means (3,8) able to operate in at least either a background mode in which the electronic call assistant means (3,8) is able to monitor a first number of tasks or in a foreground mode in which the electronic call assistant means (3,8) is able to control carrying out a second number of tasks, the foreground mode comprising a main menu mode in which the electronic call assistant means (3,8) is able to receive commands of said user, the commands being related to tasks of equal priority, wherein the electronic call assistant means (3,8) is arranged to arranged waiting tasks in a priority list in accordance with a priority sequence, and the foreground mode comprises at least a guiding mode which is entered by the electronic call assistance means (3,8) as soon as a user of the electronic call assistance means has switched the electronic call assistant means (3,8) from its background to its foreground mode and in which the electronic call assistant means (3,8) controls carrying out the waiting tasks in accordance with the priority sequence of the waiting tasks in the priority list.

\* \* \* \* \*